US009723527B2

(12) United States Patent
Su et al.

(10) Patent No.: US 9,723,527 B2
(45) Date of Patent: Aug. 1, 2017

(54) METHOD AND APPARATUS FOR BACK TO BACK RESELECTION SCHEDULING UPON CELL RESELECTION FAILURE

(71) Applicant: QUALCOMM Incorporated, San Diego, CA (US)

(72) Inventors: Yi Su, San Jose, CA (US); Harish Venkatachari, Sunnyvale, CA (US); Sundaresan Tambaram Kailasam, San Diego, CA (US); Uzma Khan, San Marcos, CA (US); Preyas Devangbhai Desai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/045,388

(22) Filed: Oct. 3, 2013

(65) Prior Publication Data

US 2014/0315551 A1 Oct. 23, 2014

Related U.S. Application Data

(60) Provisional application No. 61/814,662, filed on Apr. 22, 2013.

(51) Int. Cl.
*H04W 36/00* (2009.01)
*H04W 36/08* (2009.01)
*H04W 76/04* (2009.01)

(52) U.S. Cl.
CPC ......... *H04W 36/08* (2013.01); *H04W 76/048* (2013.01)

(58) Field of Classification Search
USPC ........ 455/432.1, 435.2–453.3, 436–453, 458
See application file for complete search history.

(56) References Cited

U.S. PATENT DOCUMENTS

| 8,504,039 | B2 * | 8/2013 | Narasimha et al. .......... 455/436 |
| 9,020,499 | B2 * | 4/2015 | Deivasigamani et al. . 455/426.1 |
| 2004/0116110 | A1 * | 6/2004 | Amerga et al. ............ 455/422.1 |
| 2009/0149180 | A1 | 6/2009 | Kitazoe |
| 2010/0165835 | A1 | 7/2010 | Hsu et al. |
| 2010/0222055 | A1 | 9/2010 | Cho et al. |
| 2010/0331019 | A1 * | 12/2010 | Bhattacharjee et al. ...... 455/458 |
| 2012/0069816 | A1 | 3/2012 | Bhandari et al. |

(Continued)

FOREIGN PATENT DOCUMENTS

WO 2008/143563 A1 11/2008
WO WO-2013/050646 A2 4/2013

OTHER PUBLICATIONS

ETSI TS 136 304 V9.1.0 (Feb. 2010) LTE; Evolved Universal Terrestrial Radio Access (E-UTRA); User Equipment (UE) procedures in idle mode (3GPP TS 36.304 version 9.1.0 Release 9).

(Continued)

*Primary Examiner* — Dai A Phuong
(74) *Attorney, Agent, or Firm* — Arent Fox LLP

(57) ABSTRACT

Methods and apparatus for wireless communication for improving back to back cell reselection that includes establishing that cell reselection to a primary candidate cell has failed. Afterwards, a UE determines if a set of predetermined conditions have been triggered and schedules cell reselection to a secondary candidate based on whether the set of predetermined conditions have been triggered.

11 Claims, 9 Drawing Sheets

(56) References Cited

U.S. PATENT DOCUMENTS

| | | | |
|---|---|---|---|
| 2012/0190378 A1* | 7/2012 | Han et al. ................... | 455/452.2 |
| 2013/0065594 A1 | 3/2013 | Somasundaram et al. | |
| 2013/0107866 A1* | 5/2013 | Leu ..................... | H04W 52/325 |
| | | | 370/335 |
| 2013/0295879 A1* | 11/2013 | Mahalingam ................. | 455/410 |
| 2014/0185475 A1* | 7/2014 | Ji ...................... | H04W 36/0088 |
| | | | 370/252 |
| 2014/0247811 A1* | 9/2014 | Singh ............... | H04W 36/0033 |
| | | | 370/332 |
| 2014/0295825 A1* | 10/2014 | Chuang ................ | H04W 24/04 |
| | | | 455/425 |
| 2014/0321416 A1* | 10/2014 | Pragada ............... | H04W 88/04 |
| | | | 370/329 |
| 2014/0357214 A1* | 12/2014 | Czaja .................... | H04M 11/04 |
| | | | 455/404.1 |
| 2015/0282033 A1* | 10/2015 | Lunden ............. | H04W 36/0055 |
| | | | 455/436 |
| 2016/0029413 A1* | 1/2016 | Wang ............... | H04W 74/0833 |
| | | | 370/329 |
| 2016/0050610 A1* | 2/2016 | Somasundaram ... | H04J 11/0093 |
| | | | 455/436 |

OTHER PUBLICATIONS

International Search Report and Written Opinion—PCT/US2014/033946—ISA/EPO—Nov. 17, 2014, (9 total pages).

* cited by examiner

METHOD AND APPARATUS FOR BACK TO BACK RESELECTION SCHEDULING UPON CELL RESELECTION FAILURE

CLAIM OF PRIORITY UNDER 35 U.S.C. §119

The present application for patent claims priority to U.S. Provisional Application No. 61/814,662 entitled "METHOD AND APPARATUS FOR BACK TO BACK RESELECTION SCHEDULING UPON CELL RESELECTION FAILURE" filed Apr. 22, 2013, and assigned to the assignee hereof and hereby expressly incorporated by reference.

BACKGROUND

Field

Aspects of the present disclosure relate generally to wireless communication systems, and more particularly, to an apparatus and method for improving back to back cell reselection, thereby providing consistent service in a wireless communication system.

Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Thus, aspects of this apparatus and method for improving back to back cell reselection, thereby providing consistent service in a wireless communication system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods and apparatus for wireless communication for improving back to back cell reselection that includes establishing that cell reselection to a primary candidate cell has failed. Afterwards, a user equipment (UE) determines if a set of predetermined conditions have been triggered and schedules cell reselection to a secondary candidate based on whether the set of predetermined conditions have been triggered.

A method for improving back to back cell reselection is provided. The method includes establishing cell reselection to a primary candidate cell has failed during a discontinuous reception (DRX) cycle. Further, the method includes determining a set of predetermined conditions have been triggered when the cell reselection to the primary candidate cell has failed. Additionally, the method includes scheduling cell reselection to a secondary candidate cell during the DRX cycle based on whether the set of predetermined conditions have been triggered.

In another aspect, an apparatus for improving back to back cell reselection is provided. The apparatus includes a processor configured to establish cell reselection to a primary candidate cell has failed during a DRX cycle. Further, the processor is configured to determine a set of predetermined conditions have been triggered when the cell reselection to the primary candidate cell has failed. Additionally, the processor is configured to schedule cell reselection to a secondary candidate cell during the DRX cycle based on whether the set of predetermined conditions have been triggered.

In another aspect, an apparatus for improving back to back cell reselection is provided that includes means for establishing cell reselection to a primary candidate cell has failed during a DRX cycle. Further, the apparatus includes means for determining a set of predetermined conditions have been triggered when the cell reselection to the primary candidate cell has failed. Additionally, the apparatus includes means for scheduling cell reselection to a secondary candidate cell during the DRX cycle based on whether the set of predetermined conditions have been triggered.

In yet another aspect, a computer-readable media for improving back to back cell reselection is provided that includes machine-executable code for establishing cell reselection to a primary candidate cell has failed during a DRX cycle. Further, the code may be executable for determining a set of predetermined conditions have been triggered when the cell reselection to the primary candidate cell has failed. Additionally, the code may be executable for scheduling cell reselection to a secondary candidate cell during the DRX cycle based on whether the set of predetermined conditions have been triggered.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally in UMTS, the user equipment (UE) regularly searches for a better cell to camp on based on the cell reselection criterion. This mechanism is needed to ensure an acceptable quality of the camping cell and achieve the desired call setup performance.

Depending on the measured quality of the camping cell, the UE may trigger intra-frequency, inter-frequency, and inter-RAT measurements and evaluate the cell reselection criterion. The cell reselection criterion is evaluated by comparing the quality of the camping cell with the quality of the cells detected during intra-frequency, inter-frequency, and inter-RAT searches. For intra-frequency and inter-frequency measurements, the measurement quantity can be either the CPICH Ec/No or the CPICH received signal code power (RSCP). For example, in CPICH Ec/No, the reselection criterion is such that the UE will reselect to a new cell if the quality of the new cell is at least $Qhyst_{2s}+Qoffset_{2n}$ dB better for $T_{reselection}$ seconds than the camping cell quality. Thereafter, the UE shall reselect to a cell if the reselection criterion is fulfilled.

However, a cell reselection may still fail. Specifically, if a WCDMA reselection candidate (either a closed subscriber group (CSG) cell or a non-CSG cell) fails cell reselection, the UE reverts back to the previously camped cell. No cell reselection will be triggered until the next time cell reselection criterion is evaluated. As a result, reselection failure incurs reselection delays and the UE has to remain in a sub-optimal serving cell for a longer time.

Thus, aspects of this apparatus and method for back to back cell reselection, thereby providing consistent service in a wireless communication system.

Figure 1:
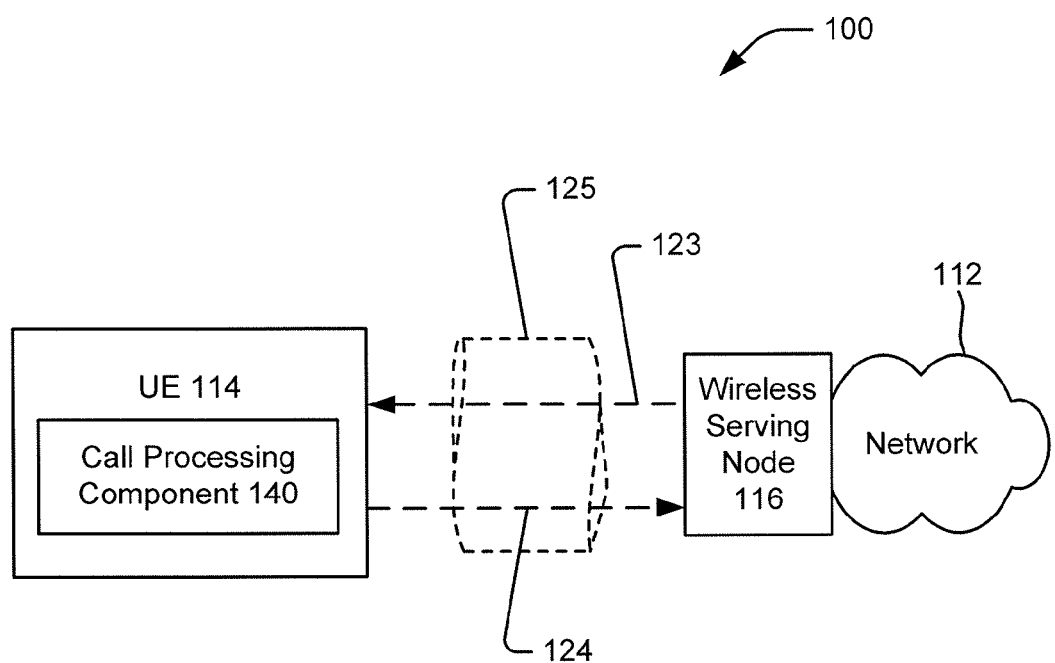
FIG. 1 is a schematic diagram illustrating an example aspect of call processing in a wireless communication system.

Referring to FIG. 1, in one aspect, a wireless communication system 100 is configured to facilitate transmitting vast amount of data from a mobile device to a network. Wireless communication system 100 includes at least one UE 114 that may communicate wirelessly with one or more network 112 via serving nodes, including, but not limited to, wireless serving node 116 over one or more wireless link 125. The one or more wireless link 125, may include, but are not limited to, signaling radio bearers and/or data radio bearers. Wireless serving node 116 may be configured to transmit one or more signals 123 to UE 114 over the one or more wireless link 125, and/or UE 114 may transmit one or more signals 124 to wireless serving node 116. In an aspect, signal 123 and signal 124 may include, but are not limited to, one or more messages, such as transmitting a data from the UE 114 to the network via wireless serving node 116.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other small base station.

Figure 2:
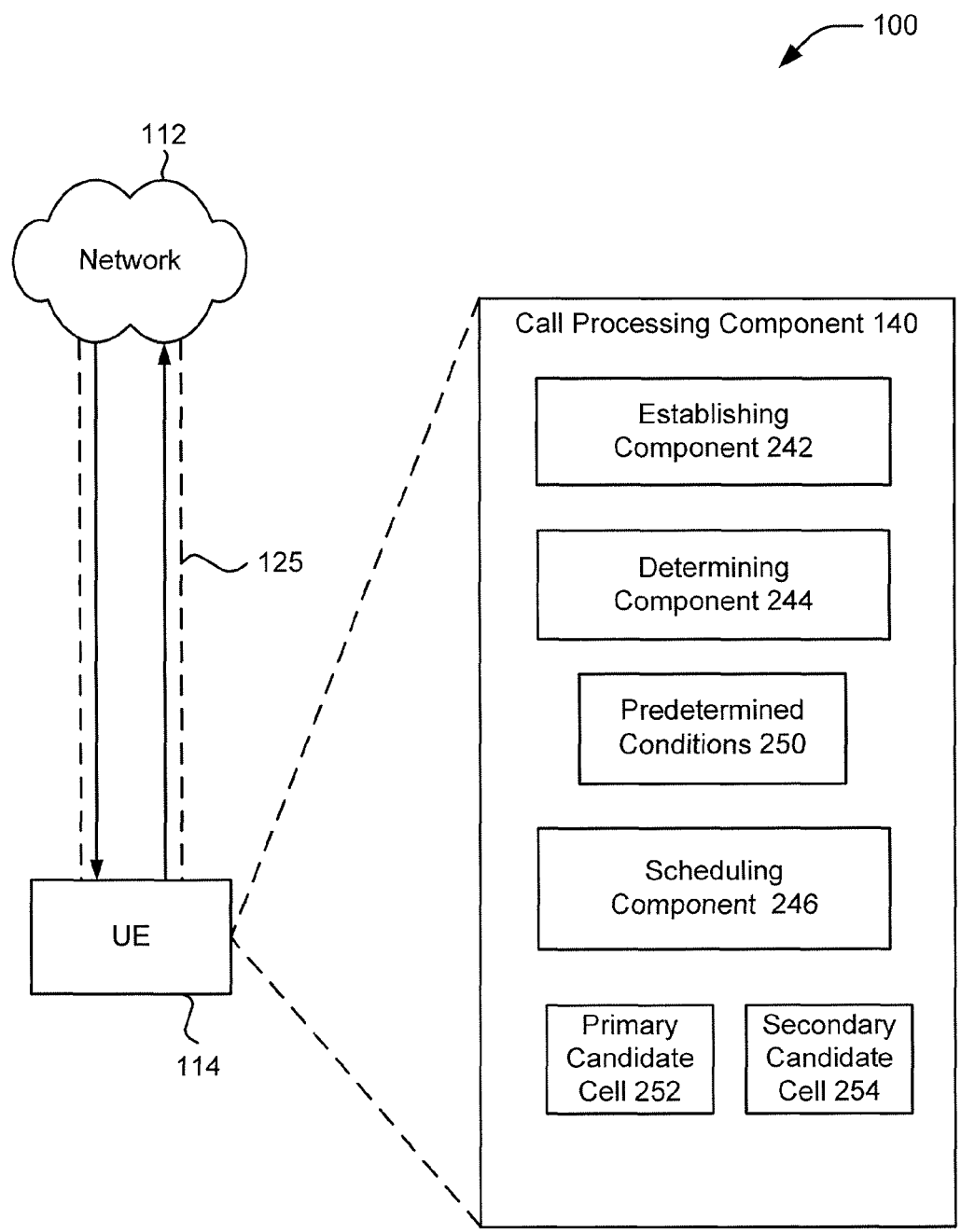
FIG. 2 is a schematic diagram illustrating another exemplary aspect of call processing in a wireless communication system.

Referring to FIG. 2, in an aspect of the present apparatus and method, a wireless communication system 100 is configured to include wireless communications between network 112 and UE 114. The wireless communications system may be configured to support communications between a number of users. FIG. 2 illustrates a manner in which network 112 communicates with UE 114 over wireless link 125. The wireless communication system 100 can be configured for downlink message transmission or uplink message transmission, as represented by the up/down arrows between network 112 and UE 114.

In an aspect, within the network 112 resides a call processing component 140. Call processing component 140 may be configured, among other things, to include a establishing component 242 configured for establishing cell reselection to a primary candidate cell has failed during a discontinuous reception (DRX) cycle. For example, establishing component 242 is configured to establish that cell reselection to primary candidate cell 252 has failed during a DRX cycle. The primary candidate cell 252 is defined as a femto or macro cell outside of the serving cell which has the best connectivity service for UE 114.

It should also be noted that cell resection to a primary candidate cell occurs when the measured quality of the cell the UE is currently camped on degrades. As a result of decreasing quality, the UE may trigger intra-frequency, inter-frequency, and inter-RAT measurements to candidate cells and evaluates cell reselection criterion of candidate cells for cell reselection.

Call processing component 140 may be configured to include a determining component 244 configured for determining a set of predetermined conditions have been triggered when the cell reselection to the primary candidate cell has failed. The For example, determining component 244 is configured to determine that a set of predetermined conditions 250 have been triggered when cell reselection to primary candidate cell 252 has failed.

The predetermined conditions 250 for determining when cell reselection to primary candidate cell 252 has failed include whether the UE is in panic mode and whether cell reselection failure to primary candidate cell 252 is due to non-RF related factors.

To determine whether the UE is in panic mode, the CPICH Ec/Io of the UE must be less than or equal to a first predetermined threshold value if the UE is currently camped on a macro cell. Additionally, the UE may be determined to be in panic mode when CPICH Ec/Io of the UE is less than or equal to a second predetermined threshold value if the UE is currently camped on a femto cell. It should be noted that the second predetermined threshold value for the femto cell is lower than the first predetermined threshold value for the macro cell. For example and for illustration purposes only, if the UE is currently camped on a macro cell, the predetermined threshold value of CPICH Ec/Io may be negative 16 dB. On the other hand, if the UE is currently camped on a femto cell, the predetermined threshold value of CPICH Ec/Io may be negative 20 dB.

Indeed, when a UE is determined to be in panic mode, the serving cell's (i.e., the macro cell or the femto cell) condition is deemed to be poor and the UE may be required to perform intra-frequency full search often to find suitable candidates cells. At this point, power consumption by the UE is not important relative to performing intra-frequency full search since the UE may go into out-of-service (OOS) and drop the call with the serving cell.

To determine whether cell reselection failure to the primary candidate cell 252 is due to non-RF related factors, the UE determines if the non-RF related factors causing failure of connection to primary candidate cell 252 include forbidden or non-equal public land mobile network (PLMN), cell barred, and non-white Closed Subscriber Group (CSG), etc.

For instance, if a candidate cell is considered to part of a forbidden network e.g. when the network is considered to be part of a roaming network for the UE) or belonging to a PLMN which is not indicated as being equivalent to the registered PLMN, then the highest ranked candidate cell or best cell is an intra-frequency, inter-frequency cell, or inter-radio access technology (RAT) cell which is not on the same frequency as the UE. As such, the UE would not consider this cell as a candidate cell for reselection.

Additionally, if a candidate cell is considered to be cell barred, the UE would not consider this cell as a candidate cell for reselection since the UE is not permitted to receive any multimedia broadcast multicast service (MBMS) services from the cell.

Moreover, if a candidate cell is considered to be on a non-white CSG cell where the CSG ID broadcast by the CSG cell is present in the CSG white list associated with the PLMN, the UE would not consider this cell as a candidate cell for reselection.

However, when the UE determines that reselection failure is caused by RF related causes (i.e., whether the reselection criteria is not met for neighbor cell, system information block (SIB) wait timer expiry, SIB decoding failure, etc.,), this means the channel conditions have dramatically changed for primary candidate cell 252 and reselection to secondary candidate cell 254 is likely to fail due to the similar reasons.

As such, if the UE determines that the UE is in panic mode and cell reselection failure of primary candidate cell 252 is due to non-RF related factors, determining component 244 is configured to determine that the a set of predetermined conditions 250 have been triggered.

However, if the UE is not in panic mode or if the UE determines that the cell reselection failure to the primary candidate cell 252 is due to RF related factors, determining component 244 is configured to determine that the a set of predetermined conditions 250 have not been triggered.

Call processing component 140 may be configured to include a scheduling component 246 configured for scheduling cell reselection to a secondary candidate cell during the DRX cycle based on whether the set of predetermined conditions have been triggered. For example, scheduling component 246 is configured to schedule cell reselection to secondary candidate cell 254 during the DRX cycle based on whether the set of predetermined conditions 250 have been triggered. The secondary candidate cell 254 is defined as a femto or macro cell outside of the serving cell which has the second best connectivity service for UE 114.

Optionally, if cell reselection to the secondary candidate cell 254 fails, scheduling component 246 of UE 114 schedules cell reselection to next best candidate cell within range of UE 114. In other words, the above mechanism is iteratively repeated until UE 114 is connected to the best possible candidate cell.

In a specific implementation, if a UE 114 loses connection to a serving cell (e.g., due to weather conditions, mobility of the UE, service outages to the serving femto cell, etc.), UE 114 attempts to connect (reselection) to primary candidate cell 252. Thereafter, establishing component 242 of UE 114 may establish that cell reselection to primary candidate cell 252 has failed. At this point, determining component 244 of UE 114 may then determine why the cell reselection to primary candidate cell 252 has failed. If determining component 244 determines that that UE 114 is in panic mode and cell reselection failure to primary candidate cell 252 is due to non-RF related factors, scheduling component 246 of UE 114 schedules cell reselection to secondary candidate cell 254 within range of UE 114.

Figure 3:
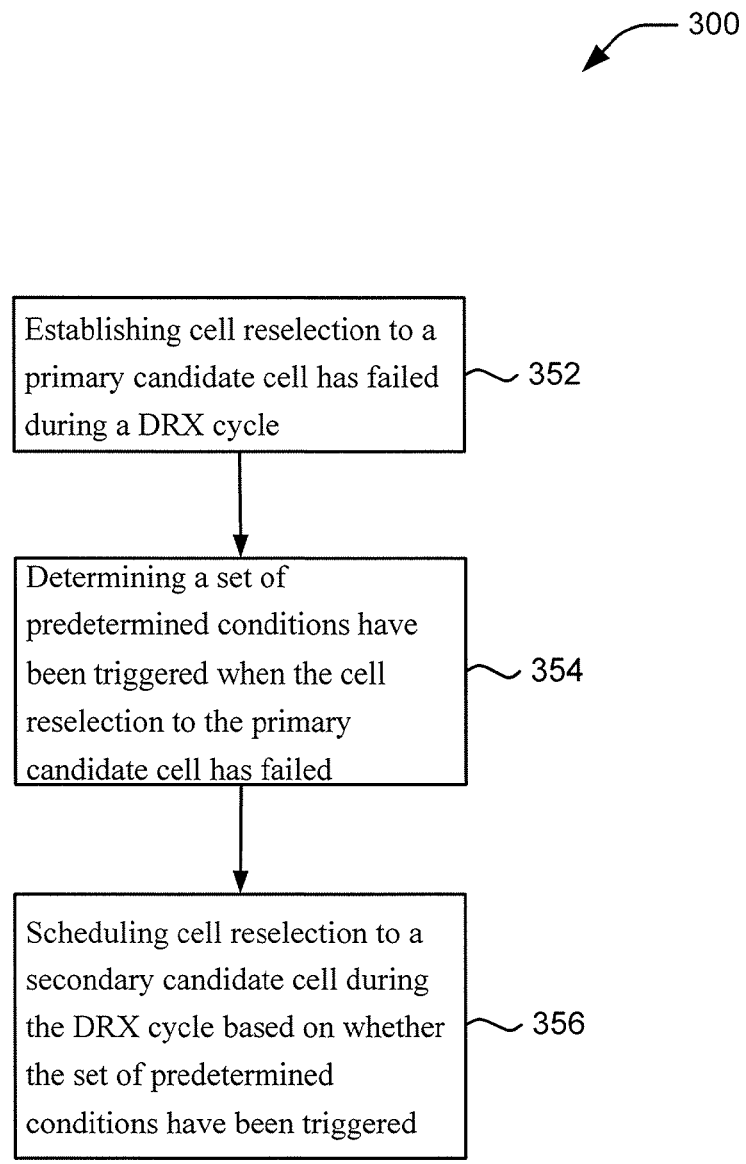
FIG. 3 is a flow diagram illustrating the exemplary method for call processing in a wireless communication system.

FIG. 3 is a flow diagram illustrating an exemplary method 300. At 352, a UE is configured for establishing cell reselection to a primary candidate cell has failed during a DRX cycle. For example, as discussed above with reference to FIG. 2, establishing component 242 of UE 114 establishes that cell reselection to primary candidate cell 252 has failed during a DRX cycle.

At 354, a UE is configured for determining a set of predetermined conditions have been triggered when the cell reselection to the primary candidate cell has failed. For example, after establishing component 242 of UE 114 establishes that cell reselection to a primary candidate cell has failed during a DRX cycle, determining component 244 of UE 114 determines that a set of predetermined conditions 250 have been triggered when cell reselection to primary candidate cell 252 has failed.

At 356, a UE is configured for scheduling cell reselection to a secondary candidate cell during the DRX cycle based on whether the set of predetermined conditions have been triggered. For example, after determining component 244 of UE 114 determines that a set of predetermined conditions have been triggered when the cell reselection to the primary candidate cell has failed, scheduling component 246 of UE 114 is configured to schedule cell reselection to secondary candidate cell 254 during the DRX cycle based on whether the set of predetermined conditions 250 have been triggered.

In an aspect, for example, the executing method 300 may be UE 114 or network 112 (FIG. 1) executing the call processing component 140 (FIGS. 1 and 2), or respective components thereof.

Figure 4:
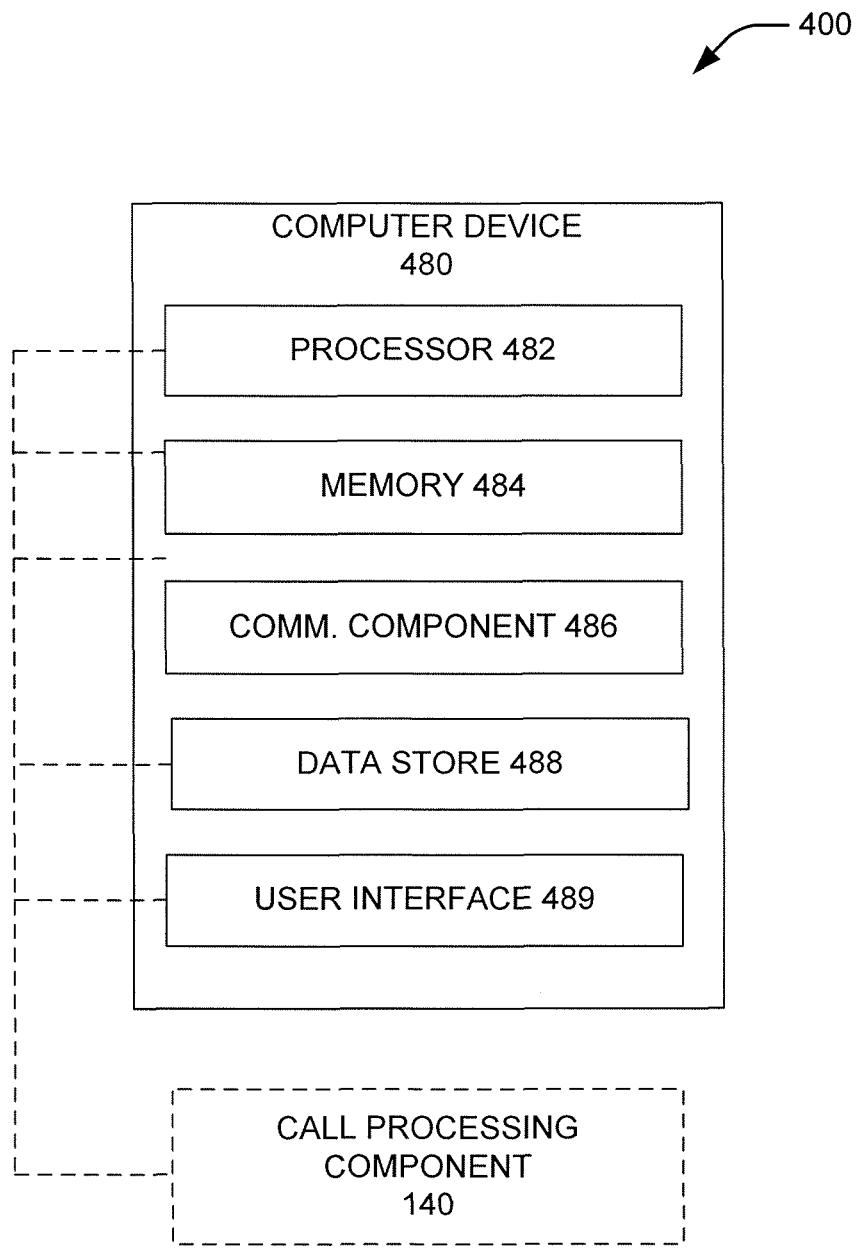
FIG. 4 is a block diagram illustrating additional example components of an aspect of a computer device having a call processing component according to the present disclosure.

Referring to the computer system 400 of FIG. 4, in one aspect, UE 114 and/or wireless serving node 116 of FIGS. 1 and 2 may be represented by a specially programmed or configured computer device 480, wherein the special programming or configuration includes call processing component 140, as described herein. For example, for implementation as UE 114 (FIGS. 1 and 2), computer device 480 may include one or more components for computing and transmitting a data from a UE 114 to network 112 via wireless serving node 116, such as in specially programmed computer readable instructions or code, firmware, hardware, or some combination thereof. Computer device 480 includes a processor 482 for carrying out processing functions associated with one or more of components and functions described herein. Processor 482 can include a single or multiple set of processors or multi-core processors. Moreover, processor 482 can be implemented as an integrated processing system and/or a distributed processing system.

Computer device 480 further includes a memory 484, such as for storing data used herein and/or local versions of applications being executed by processor 482. Memory 484 can include any type of memory usable by a computer, such as random access memory (RAM), read only memory (ROM), tapes, magnetic discs, optical discs, volatile memory, non-volatile memory, and any combination thereof.

Further, computer device 480 includes a communications component 486 that provides for establishing and maintaining communications with one or more parties utilizing hardware, software, and services as described herein. Communications component 486 may carry communications between components on computer device 480, as well as between computer device 480 and external devices, such as devices located across a communications network and/or devices serially or locally connected to computer device 480. For example, communications component 486 may include one or more buses, and may further include transmit chain components and receive chain components associated with a transmitter and receiver, respectively, or a transceiver, operable for interfacing with external devices. For example, in an aspect, a receiver of communications component 486 operates to receive one or more data via a wireless serving node 116, which may be a part of memory 484.

Additionally, computer device 480 may further include a data store 488, which can be any suitable combination of hardware and/or software, that provides for mass storage of information, databases, and programs employed in connection with aspects described herein. For example, data store 488 may be a data repository for applications not currently being executed by processor 482.

Computer device 480 may additionally include a user interface component 489 operable to receive inputs from a user of computer device 480, and further operable to generate outputs for presentation to the user. User interface component 489 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 489 may include one or more output devices, including but not limited to a display, a speaker, a haptic feedback mechanism, a printer, any other mechanism capable of presenting an output to a user, or any combination thereof.

Furthermore, computer device 480 may include, or may be in communication with, call processing component 140, which may be configured to perform the functions described herein.

Figure 5:
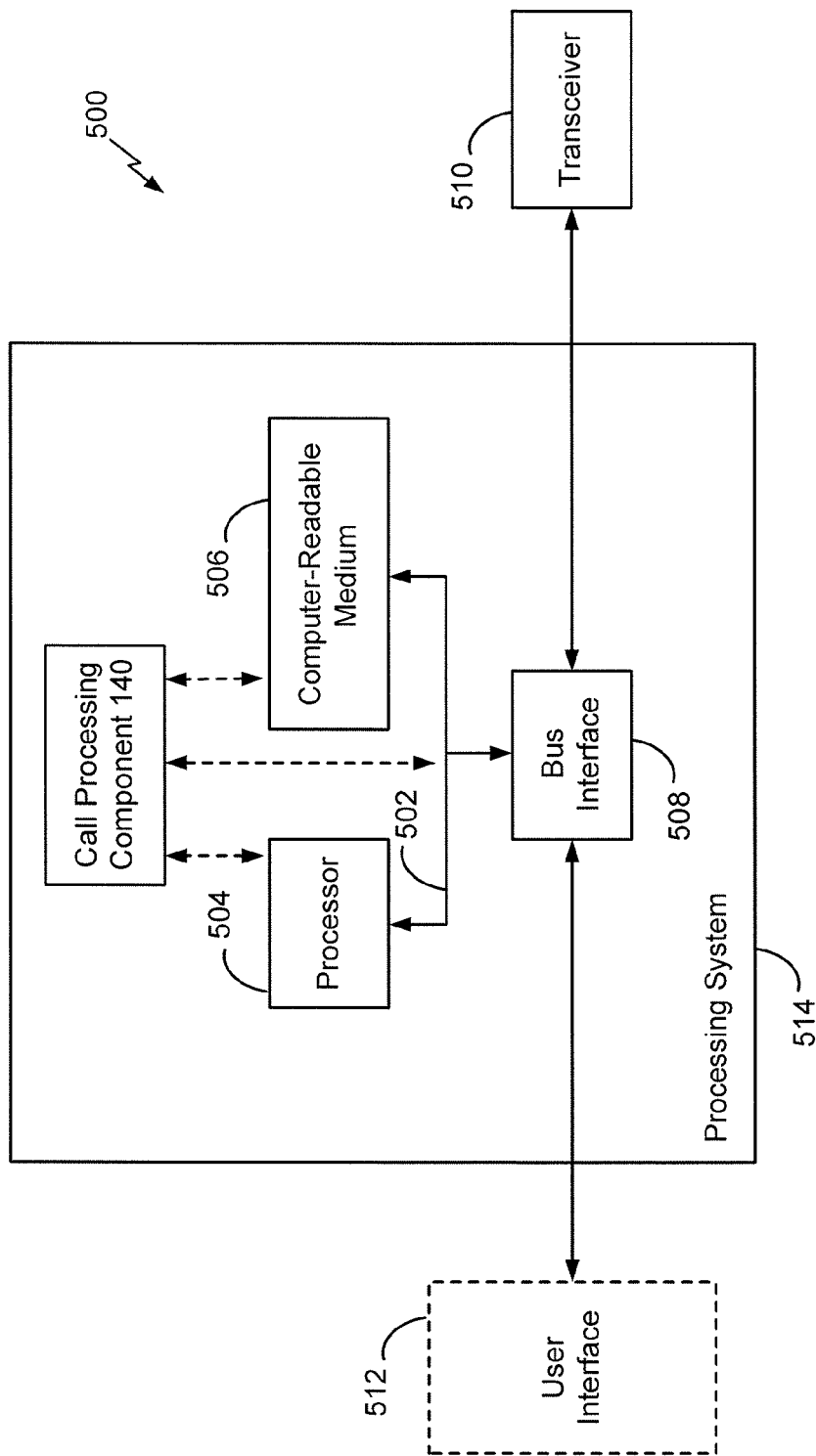
FIG. 5 is a block diagram illustrating an example of a hardware implementation for an apparatus employing a processing system to perform the functions described herein.

FIG. 5 is a block diagram illustrating an example of a hardware implementation for an apparatus 500 employing a processing system 514. Apparatus 500 may be configured to include, for example, wireless communication system 100 (FIGS. 1 and 2) and/or call processing component 140 (FIGS. 1 and 2) implementing the components described above, such as establishing component 242, determining component 244, and scheduling component 246. In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described infra for any particular apparatus. The computer-readable medium 506 may also be used for storing data that is manipulated by the processor 504 when executing software.

In an aspect, processor 504, computer-readable medium 506, or a combination of both may be configured or otherwise specially programmed to perform the functionality of the call processing component 140 (FIGS. 1 and 2) as described herein.

The various concepts presented throughout this disclosure may be implemented across a broad variety of telecommunication systems, network architectures, and communication standards.

Figure 6:
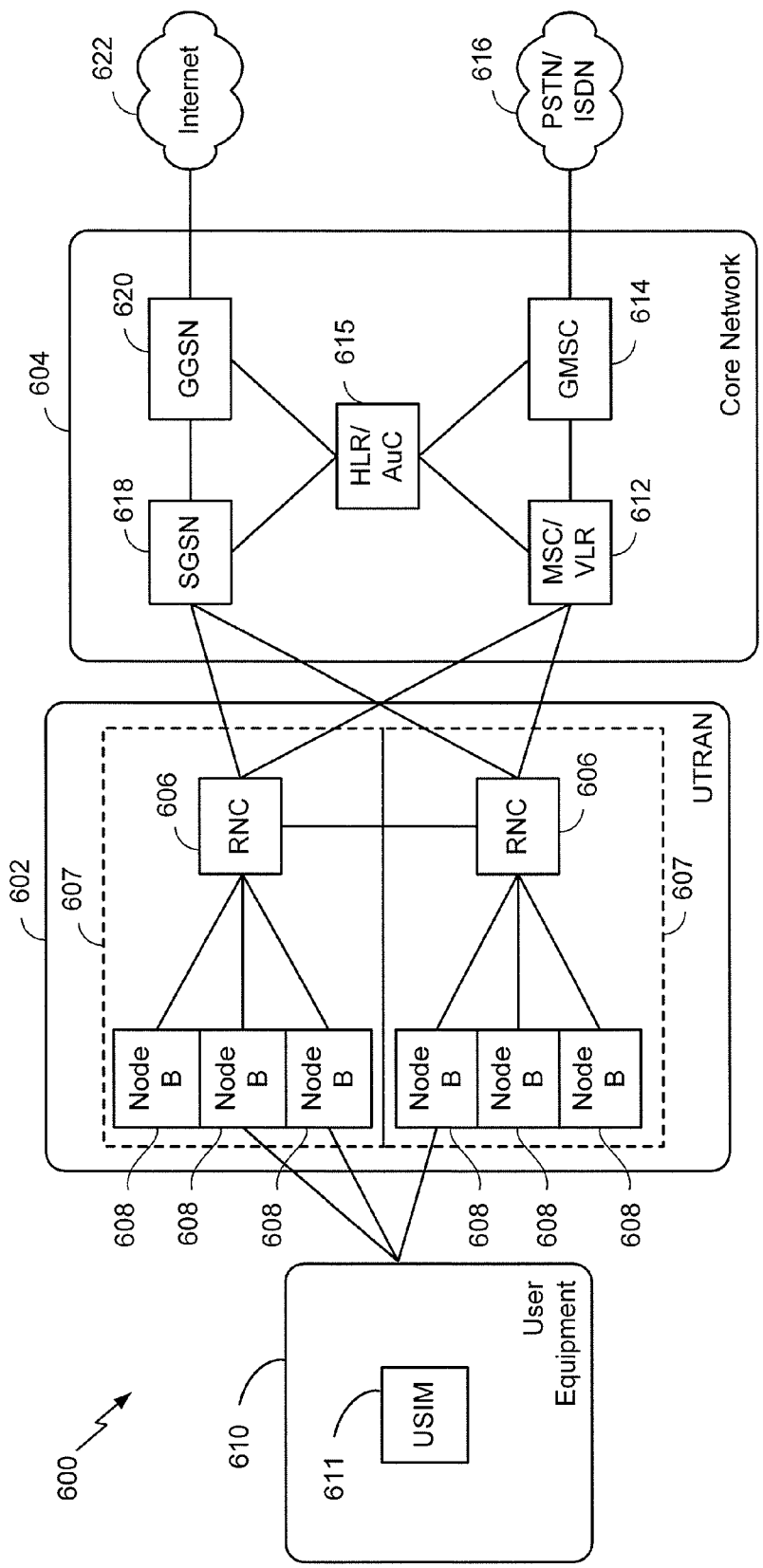
FIG. 6 is a block diagram conceptually illustrating an example of a telecommunications system including a UE configured to perform the functions described herein.

Referring to FIG. 6, by way of example and without limitation, the aspects of the present disclosure are presented with reference to a UMTS system 600 employing a W-CDMA air interface. A UMTS network includes three interacting domains: a Core Network (CN) 604, a UMTS Terrestrial Radio Access Network (UTRAN) 602, and User Equipment (UE) 610. UE 610 may be configured to include, for example, the call processing component 140 (FIGS. 1 and 2) implementing the components described above, such as establishing component 242, determining component 244, and scheduling component 246. In this example, the UTRAN 602 provides various wireless services including telephony, video, data, messaging, broadcasts, and/or other services. The UTRAN 602 may include a plurality of Radio Network Subsystems (RNSs) such as an RNS 607, each controlled by a respective Radio Network Controller (RNC) such as an RNC 606. Here, the UTRAN 602 may include any number of RNCs 606 and RNSs 607 in addition to the RNCs 606 and RNSs 607 illustrated herein. The RNC 606 is an apparatus responsible for, among other things, assigning, reconfiguring and releasing radio resources within the RNS 606. The RNC 606 may be interconnected to other RNCs (not shown) in the UTRAN 602 through various types of interfaces such as a direct physical connection, a virtual network, or the like, using any suitable transport network.

Communication between a UE 610 and a Node B 608 may be considered as including a physical (PHY) layer and a medium access control (MAC) layer. Further, communication between a UE 610 and an RNC 606 by way of a respective Node B 608 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 24.331, incorporated herein by reference.

The geographic region covered by the RNS 607 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 608 are shown in each RNS 607; however, the RNSs 607 may include any number of wireless Node Bs. The Node Bs 608 provide wireless access points to a CN 604 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 610 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 610 may further include a universal subscriber identity module (USIM) 611, which contains a user's subscription information to a network. For illustrative purposes, one UE 610 is shown in communication with a number of the Node Bs 608. The DL, also called the forward link, refers to the communication link from a Node B 608 to a UE 610, and the UL, also called the reverse link, refers to the communication link from a UE 610 to a Node B 608.

The CN 604 interfaces with one or more access networks, such as the UTRAN 602. As shown, the CN 604 is a GSM core network. However, as those skilled in the art will recognize, the various concepts presented throughout this disclosure may be implemented in a RAN, or other suitable access network, to provide UEs with access to types of CNs other than GSM networks.

The CN 604 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a VLR that contains subscriber-related information for the duration that a UE is in the coverage area of the MSC 612. The GMSC 614 provides a gateway through the MSC 612 for the UE to access a circuit-switched network 616. The GMSC 614 includes a home location register (HLR) 615 containing subscriber data, such as the data reflecting the details of the services to which a particular user has subscribed. The HLR 615 is also associated with an authentication center (AuC) that contains subscriber-specific authentication data. When a call is received for a particular UE, the GMSC 614 queries the HLR 615 to determine the UE's location and forwards the call to the particular MSC serving that location.

The CN 604 also supports packet-data services with a serving GPRS support node (SGSN) 618 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 618, which performs primarily the same functions in the packet-based domain as the MSC 612 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 608 and a UE 610. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 610 provides feedback to the node B 608 over the HS-DPCCH to indicate whether it correctly decoded a packet on the downlink.

HS-DPCCH further includes feedback signaling from the UE 610 to assist the node B 608 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 608 and/or the UE 610 may have multiple antennas supporting MIMO technology. The use of MIMO technology enables the node B 608 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 610 to increase the data rate, or to multiple UEs 610 to increase the overall system capacity. This is achieved by spatially precoding each data stream and then transmitting each spatially precoded stream through a different transmit antenna on the downlink. The spatially precoded data streams arrive at the UE(s) 610 with different spatial signatures, which enables each of the UE(s) 610 to recover the one or more the data streams destined for that UE 610. On the uplink, each UE 610 may transmit one or more spatially precoded data streams, which enables the node B 608 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
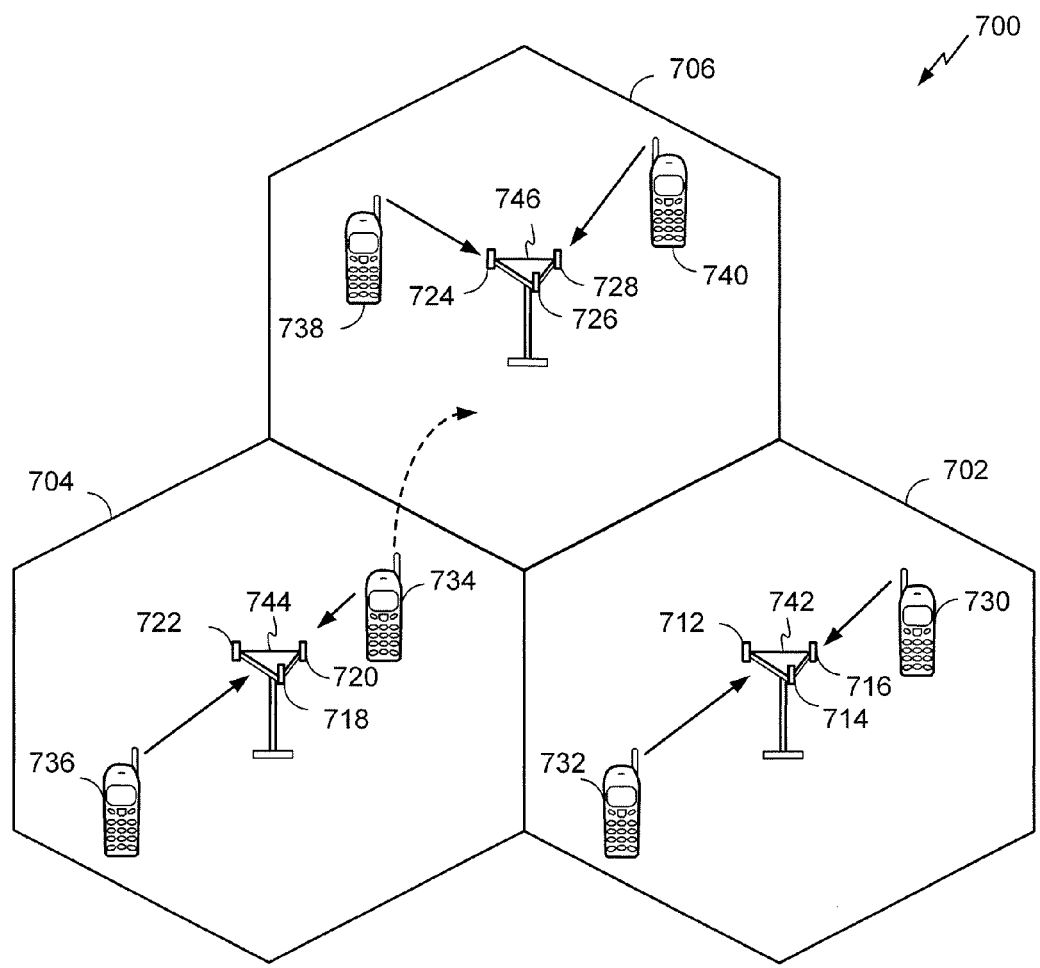
FIG. 7 is a conceptual diagram illustrating an example of an access network for use with a UE configured to perform the functions described herein.

Referring to FIG. 7, an access network 700 in a UTRAN architecture is illustrated. The multiple access wireless communication system includes multiple cellular regions (cells), including cells 702, 704, and 706, each of which may include one or more sectors. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704 and 706 may include several wireless communication devices, e.g., User Equipment or UEs, which may be in communication with one or more sectors of each cell 702, 704 or 706. For example, UEs 730 and 732 may be in communication with Node B 742, UEs 734 and 736 may be in communication with Node B 744, and UEs 738 and 740 can be in communication with Node B 746. Here, each Node B 742, 744, 746 is configured to provide an access point to a CN 604 (see FIG. 6) for all the UEs 730, 732, 734, 736, 738, 740 in the respective cells 702, 704, and 706. Node Bs 742, 744, 746 and UEs 730, 732, 734, 736, 738, 740 respectively may be configured to include, for example, the call processing component 140 (FIGS. 1 and 2) implementing the components described above, such as establishing component 242, determining component 244, and scheduling component 246.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 606 (see FIG. 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel DPCH or fractional downlink dedicated physical channel F-DPCH to the UE 734 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
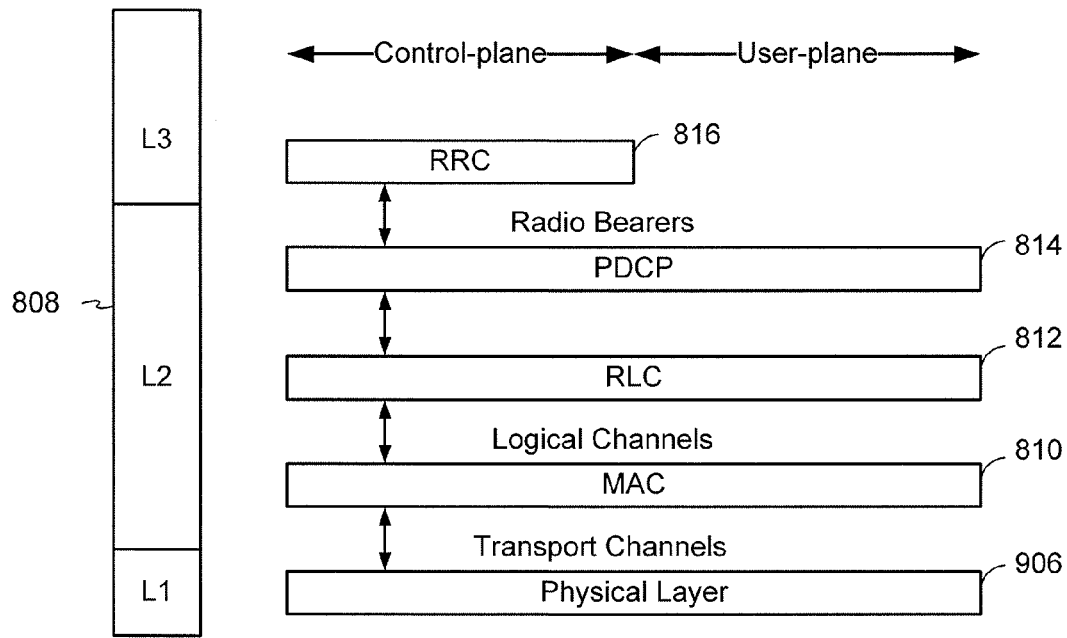
FIG. 8 is a conceptual diagram illustrating an example of a radio protocol architecture for the user and control planes for a base station and/or a UE configured to perform the functions described herein.

FIG. 8 is a conceptual diagram illustrating an example of the radio protocol architecture 800 for the user plane and the control plane of a user equipment (UE) or node B/base station. For example, architecture 800 may be included in a network entity and/or UE such as an entity within network 112 and/or UE 114 (FIGS. 1 and 2). The radio protocol architecture 800 for the UE and node B is shown with three layers 808: Layer 1, Layer 2, and Layer 3. Layer 1 is the lowest lower and implements various physical layer signal processing functions. As such, Layer 1 includes the physical layer 806. Layer 2 (L2 layer) is above the physical layer 806 and is responsible for the link between the UE and node B over the physical layer 806. Layer 3 (L3 layer) includes a radio resource control (RRC) sublayer 816. The RRC sublayer 816 handles the control plane signaling of Layer 3 between the UE and the UTRAN.

In the user plane, the L2 layer includes a media access control (MAC) sublayer 810, a radio link control (RLC) sublayer 812, and a packet data convergence protocol (PDCP) 814 sublayer, which are terminated at the node B on the network side. Although not shown, the UE may have several upper layers above the L2 layer including a network layer (e.g., IP layer) that is terminated at a PDN gateway on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between node Bs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

Figure 9:
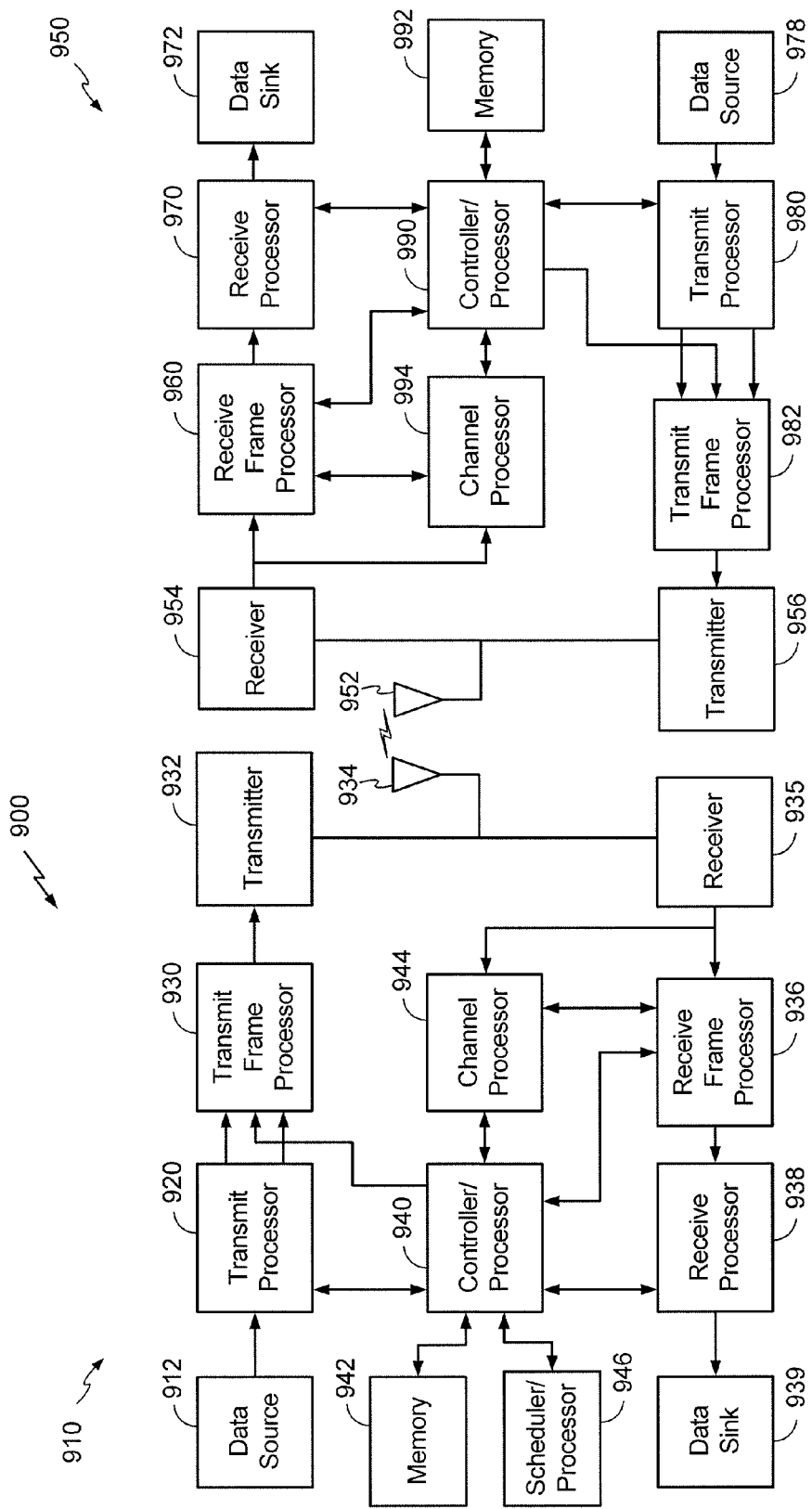
FIG. 9 is a block diagram conceptually illustrating an example of a Node B in communication with a UE in a telecommunications system configured to perform the functions described herein.

FIG. 9 is a block diagram of a communication system 900 including a Node B 910 in communication with a UE 950, where Node B 910 may be an entity within network 112 and the UE 950 may be UE 114 according to the aspect described in FIGS. 1 and 2. In the downlink communication, a transmit processor 920 may receive data from a data source 916 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 954 receives the uplink transmission through the antenna 934 and processes the transmission to recover the information modulated onto the carrier. The information recovered by the receiver 954 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.10 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 4 or 5) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506 (FIG. 5). The computer-readable medium 506 (FIG. 5) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 34 U.S.C. §112, sixth paragraph, unless the element is expressly recited using the phrase "means for" or, in the case of a method claim, the element is recited using the phrase "step for."

What is claimed is:

1. A method of wireless communication, comprising:
  establishing, at a user equipment (UE), that cell reselection from a serving cell to a primary candidate cell has failed during a discontinuous reception (DRX) cycle;
  determining, at the UE, whether a set of predetermined conditions has been triggered in response to establishing that the cell reselection to the primary candidate cell has failed, wherein determining whether the set of predetermined conditions has been triggered comprises:
    determining whether the UE is in a panic mode; and
    determining whether the cell reselection to the primary candidate cell has failed due to non-RF related factors; and
  scheduling, at the UE, cell reselection to a secondary candidate cell during the DRX cycle and before a next evaluation of cell reselection criteria based on a determination that the UE is in the panic mode and that the cell reselection to the primary candidate cell has failed due to non-RF related factors.

2. The method of claim 1, wherein determining whether the UE is in the panic mode comprises:
  determining that an Energy per Chip to Total Received Power (Ec/Io) of Common Pilot Channel (CPICH) of the UE is less than or equal to a first predetermined threshold value when the UE is camped on the macro cell, or
  determining that the Ec/Io of CPICH of the UE is less than or equal to a second predetermined threshold value when the UE is camped on the femto cell,
  wherein the second predetermined threshold value for the femto cell is lower than the first predetermined threshold for the macro cell.

3. The method of claim 1, wherein the non-RF related factors comprise a forbidden or non-equal public land mobile network (PLMN), a cell barred candidate cell, or a non-white closed subscriber group (CSG).

4. The method of claim 1, wherein scheduling cell reselection to the secondary candidate cell during the DRX cycle includes iteratively scheduling cell reselection to a next best candidate cell.

5. The method of claim 1, wherein the secondary candidate comprises a macro cell or a femto cell outside the serving cell of the UE which has a second best connectivity service for the UE.

6. An apparatus of wireless communication, comprising:
  at least one processor; and
  a memory coupled to the at least one processor, wherein the at least one processor is configured to perform operations comprising:
    establishing that cell reselection from a serving cell to a primary candidate cell has failed during a discontinuous reception (DRX) cycle;
    determining whether a set of predetermined conditions has been triggered in response to establishing that the cell reselection to the primary candidate cell has failed, wherein determining whether the set of predetermined conditions has been triggered comprises:
      determining whether the UE is in a panic mode; and
      determining whether the cell reselection to the primary candidate cell has failed due to non-RF related factors; and
    scheduling cell reselection to a secondary candidate cell during the DRX cycle and before a next evaluation of cell reselection criteria based on a determination that the UE is in the panic mode and that the cell reselection to the primary candidate cell has failed due to non-RF related factors.

7. The apparatus of claim 6, wherein determining whether the UE is in the panic mode comprises:
  determining that an Energy per Chip to Total Received Power (Ec/Io) of Common Pilot Channel (CPICH) of the UE is less than or equal to a first predetermined threshold value when the UE is camped on the macro cell, or
  determining that the Ec/Io of CPICH of the UE is less than or equal to a second predetermined threshold value when the UE is camped on the femto cell,
  wherein the second predetermined threshold value for the femto cell is less than the first predetermined threshold value for the macro cell.

8. The apparatus of claim 6, wherein the non-RF related factors include a forbidden or non-equal public land mobile network (PLMN), a cell barred candidate cell, or a non-white closed subscriber group (CSG).

9. The apparatus of claim 6, wherein scheduling cell reselection to the secondary candidate cell during the DRX cycle includes iteratively scheduling cell reselection to a next best candidate cell.

10. An apparatus of wireless communication, comprising:
  means for establishing that cell reselection from a serving cell to a primary candidate cell has failed during a discontinuous reception (DRX) cycle;
  means for determining whether a set of predetermined conditions has been triggered in response to establishing that the cell reselection to the primary candidate cell has failed, wherein the means for determining whether the set of predetermined conditions has been triggered comprises:
    means for determining whether the UE is in a panic mode; and
    means for determining whether the cell reselection to the primary candidate cell has failed due to non-RF related factors; and
  means for scheduling cell reselection to a secondary candidate cell during the DRX cycle and before a next evaluation of cell reselection criteria based on a determination that the set of UE is in the panic mode and that the cell reselection to the primary candidate cell has failed due to non-RF related factors.

11. A non-transitory computer readable medium storing computer executable code for wireless communication, comprising:
  code for establishing that cell reselection from a serving cell to a primary candidate cell has failed during a discontinuous reception (DRX) cycle;
  code for determining whether a set of predetermined conditions has been triggered in response to establishing that the cell reselection to the primary candidate cell has failed, wherein determining whether a set of predetermined conditions has been triggered comprises:
    determining whether the UE is in a panic mode; and determining whether the cell reselection to the primary candidate cell has failed due to non-RF related factors; and code for scheduling cell reselection to a secondary candidate cell during the DRX cycle and before a next evaluation of cell reselection criteria based on a determination that the UE is in the panic mode and that the cell reselection to the primary candidate cell has failed due to non-RF related factors.

\* \* \* \* \*